(12) United States Patent
Kelly

(10) Patent No.: US 11,722,036 B2
(45) Date of Patent: Aug. 8, 2023

(54) WIPER MOTORS AND METHODS OF MANUFACTURE AND USE THEREOF

(71) Applicant: Commercial Vehicle Group, Inc., New Albany, OH (US)

(72) Inventor: Joseph Kelly, Michigan City, IN (US)

(73) Assignee: COMMERCIAL VEHICLE GROUP, INC., New Albany, OH (US)

( * ) Notice: Subject to any disclaimer, the term of this patent is extended or adjusted under 35 U.S.C. 154(b) by 26 days.

(21) Appl. No.: 17/509,853

(22) Filed: Oct. 25, 2021

(65) Prior Publication Data

US 2022/0399780 A1     Dec. 15, 2022

Related U.S. Application Data

(60) Provisional application No. 63/210,361, filed on Jun. 14, 2021.

(51) Int. Cl.
| | |
|---|---|
| *H02K 7/11* | (2006.01) |
| *H02K 11/30* | (2016.01) |
| *H02K 7/116* | (2006.01) |
| *B60S 1/08* | (2006.01) |

(52) U.S. Cl.
CPC .............. *H02K 7/1166* (2013.01); *B60S 1/08* (2013.01); *H02K 11/30* (2016.01); *H02K 2211/03* (2013.01)

(58) Field of Classification Search
CPC .......... H02K 7/00; H02K 7/11; H02K 7/1166; H02K 11/00; H02K 11/30; B60S 1/00; B60S 1/08; B60S 1/16; B60S 1/166; G01P 3/00; G01P 3/48; G01P 3/487
See application file for complete search history.

(56) References Cited

U.S. PATENT DOCUMENTS

| | | | |
|---|---|---|---|
| 4,692,677 A | 9/1987 | Bauer et al. | |
| 5,570,606 A | 11/1996 | Irie | |
| 5,675,206 A | 10/1997 | Horski | |
| 5,844,338 A | 12/1998 | Horski | |
| 6,163,125 A * | 12/2000 | Bernauer ............... | H02K 29/08 318/653 |
| 6,483,296 B1 | 11/2002 | Hamaoka et al. | |
| 7,489,127 B2 | 2/2009 | Bauer et al. | |
| 7,808,196 B2 | 10/2010 | Hailinann et al. | |
| 9,000,634 B2 | 4/2015 | Tanaka et al. | |
| 9,525,322 B2 | 12/2016 | Okabe et al. | |
| 9,979,261 B2 | 5/2018 | Tanaka et al. | |
| 10,320,265 B2 | 6/2019 | Tanaka et al. | |
| 10,348,164 B2 | 7/2019 | Tanaka et al. | |

(Continued)

FOREIGN PATENT DOCUMENTS

| | | |
|---|---|---|
| CN | 209130153 U | 7/2019 |
| DE | 4317259 C | 11/1993 |

(Continued)

OTHER PUBLICATIONS

PCT Written Opinion and Search Report issued in connection with related PCT/US2022/024200 dated Jul. 1, 2022.

(Continued)

*Primary Examiner* — Tran N Nguyen
(74) *Attorney, Agent, or Firm* — Dentons US LLP

(57) ABSTRACT

This disclosure enables an assembly for driving an arm of a windshield wiper of a vehicle. The assembly includes a support structure in a housing that is secured against rotation relative to the housing. The support structure has an opening with a bearing surface, where the opening is configured to receive a boss of a worm wheel such that the bearing surface faces the boss of the worm wheel.

22 Claims, 15 Drawing Sheets

(56) References Cited

U.S. PATENT DOCUMENTS

2004/0008000 A1    1/2004  Merkel et al.
2008/0238415 A1  10/2008  Bauer et al.
2008/0246374 A1* 10/2008  Hartmann ............... B60S 1/166
                                                    310/68 B

FOREIGN PATENT DOCUMENTS

| DE | 195548385 C2 | 7/1997 |
| --- | --- | --- |
| DE | 19848081 A1 | 3/2000 |
| DE | 10201141 A1 | 8/2003 |
| DE | 10360042 A1 | 7/2005 |
| DE | 102005040646 A1 | 3/2007 |
| EP | 0359853 A1 | 3/1990 |
| GB | 2197483 A | 5/1988 |
| JP | 5044438 B2 | 10/2012 |
| JP | 2014-050309 A | 3/2014 |
| JP | 6285302 B2 | 2/2018 |
| JP | 2018-204615 A | 12/2018 |
| WO | WO95/14911 | 6/1995 |
| WO | 2005/040728 A | 5/2005 |

OTHER PUBLICATIONS

International Search Report for PCT/IB2006/003679 dated Apr. 6, 2007, 6 pages as cited under U.S. Pat. No. 7,808,196 B2.
German Search Report for German Priority Patent Application No. 102005040647.5 dated Jan. 26, 2006, 4 pages as cited under U.S. Pat. No. 7,808,196 B2.

* cited by examiner

WIPER MOTORS AND METHODS OF MANUFACTURE AND USE THEREOF

RELATED APPLICATION

This application claims the benefit of and priority to U.S. Provisional Patent Application No. 63/210,361, filed Jun. 14, 2021, the entirety of which is incorporated herein by reference to the extent permitted by law.

TECHNICAL FIELD

Generally, this disclosure relates to vehicles. More particularly, this disclosure relates to wiper motors.

BACKGROUND

One conventional assembly for driving an arm of a windshield wiper of a vehicle includes a housing, a worm drive, a motor, and a shaft, where the housing includes or is a gear housing or a gear box which houses the worm drive and the shaft. The worm drive includes a worm (e.g., a gear in a form of a screw) and a worm wheel (e.g., a spur gear), where the worm meshes with the worm wheel. The worm wheel has a first side having a boss outwardly projecting therefrom and a second side facing away (e.g., opposite) from the first side. The shaft has a proximal end portion fixed to the worm wheel and a distal end portion that is external to the second side. The arm of the wiper is attached to the distal end portion of the shaft. The motor is controlled via various electronics (e.g., on a circuit board) housed slightly above the worm wheel. Therefore, the motor drives (e.g., rotates) the worm which in turn drives the worm wheel and the arm is pivoted when the shaft is rotated via the worm wheel meshing with the worm driven via the motor, as controlled via the various electronics.

The worm can be referred to, as it is herein, as a driving gear, while the worm wheel can be referred to as a driven gear or driven spur gear.

Electronically controlled wiper motors are sometimes referred to as smart wiper motors, and the motors as smart motors, since the electronics are such that the motors can be configured to be controlled to address different conditions and provide variable functionality such as, e.g., intermittent operation, operation coordinated among various wipers, or operation appropriate for sensed weather or visibility conditions.

SUMMARY

Disclosed herein are various technologies that address disadvantages of wiper motors. These technologies enable (a) the shaft to be supported at its proximal end portion even when the motor control electronics are placed such that no receptacle can be formed to accept the proximal end portion or (b) the driven spur gear to be supported not only by the shaft. These forms of support are sufficiently stable, especially when the vehicle is moving, and effectively minimize the worm wheel moving laterally (e.g., wobbling) during rotation, which in-turn effectively minimizes cascading of such lateral movement to the arm, thereby effectively minimizing various negative impacts on how the arm pivots. These technological benefits are accomplished through an inclusion of a support structure in the gear housing or gear box that is secured against rotation relative to the gear housing or gear box. The support structure has an opening with a bearing surface, where the opening is configured to receive the boss of the driven spur gear such that the bearing surface faces the boss of the driven spur gear. Resultantly, by having the support structure included in the housing, the shaft may be supported via the gear housing or gear box by the support structure even when the various electronics are present or the worm wheel may be supported not only by the shaft but also by the support structure.

In an embodiment, an apparatus comprises: a motor; a housing secured to the motor; a worm drive including a worm and a worm wheel, the worm extending within the housing and meshing with the worm wheel, the worm being connected to be driven by the motor, the worm wheel including a first side and a second side opposing the first side, the first side including a boss outwardly projecting therefrom; a shaft extending from the second side away from the boss, the shaft having a proximal end portion secured to the worm wheel; and a support structure extending laterally within the housing, the support structure being secured against rotation relative to the housing and the worm wheel, the support structure including an opening with a bearing surface, the boss being rotatable within the opening relative to the housing and the support structure.

These and other embodiments of this disclosure are discussed in greater detail below with reference to various accompanying drawings.

DETAILED DESCRIPTION

Figure 1:
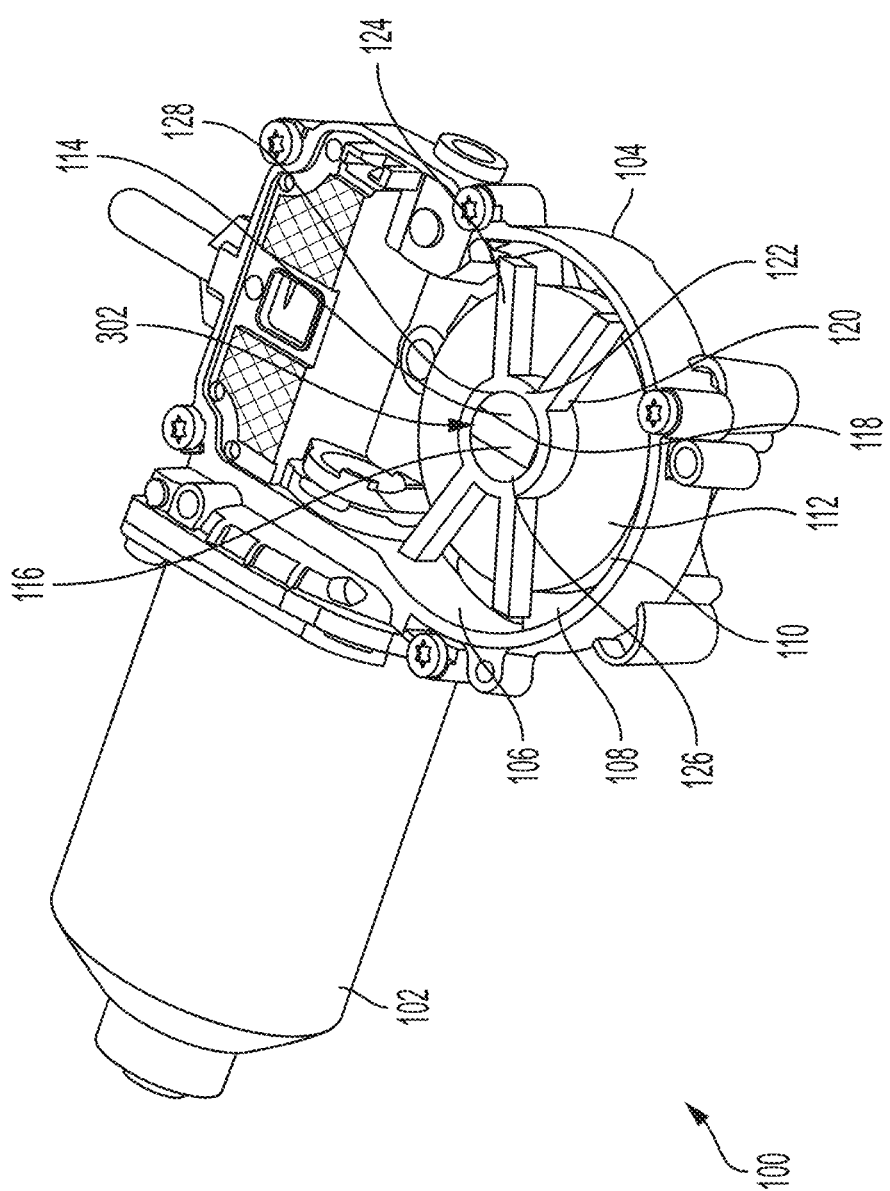
FIG. 1 illustrates a perspective view of an embodiment of an assembly for driving an arm of a windshield wiper of a vehicle, where the assembly includes a first support structure according to principles disclosed herein.

Generally, this disclosure enables an assembly for driving an arm of a windshield wiper of a vehicle. The assembly includes a support structure in a housing that is secured against rotation relative to the housing. The support structure has an opening with a bearing surface, where the opening is configured to receive a boss of a worm wheel or driven spur gear such that the bearing surface faces the boss of the worm wheel or driven spur gear.

Various terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly coupled" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from various teachings of this disclosure.

Terminology used herein is for describing particular embodiments and is not intended to be necessarily limiting of this disclosure. As used herein, various singular forms "a," "an" and "the" are intended to include various plural forms as well, unless a context clearly indicates otherwise. Various terms "comprises," "includes" and/or "comprising," "including" when used in this specification, specify a presence of stated features, integers, steps, operations, elements, and/or components, but do not preclude the presence and/or addition of one or more other features, integers, steps, operations, elements, components, and/or groups thereof.

As used herein, a term "or" is intended to mean an inclusive "or" rather than an exclusive "or." That is, unless specified otherwise, or clear from context, "X employs A or B" is intended to mean any of a set of natural inclusive permutations. That is, if X employs A; X employs B; or X employs both A and B, then "X employs A or B" is satisfied under any of the foregoing instances.

Also, "gear housing" and "gear box" are used interchangeably and refer to a housing or that part of a housing within which the driving and driven gears are located. While the term "worm wheel" is associated with a worm drive, as used herein, the term "worm wheel" also generically includes driven spur gears as they have the same basic configuration. It is only preferred that a worm drive be employed because the worm drive enables a more compact assembly and because such drives are very robust. However, it is conceivable to employ principles disclosed herein in another type of arrangement employing, e.g., two spur gears, where there is a first spur gear connected to a motor shaft, and a second spur gear driven (e.g., via meshing) by the first spur gear.

Described herein are at least three assemblies Those parts and features that are the same or essentially the same among the assemblies are described first and mostly in connection with the assembly in which they are first introduced. Thereafter the same reference numerals are used through the figures.

FIG. 1 illustrates a perspective view of an apparatus or assembly 100 for driving an arm of a windshield wiper of a vehicle, where the assembly includes a first support structure according to principles disclosed herein. In particular, the assembly 100 includes a motor 102 (e.g., brushed, brushless) and a housing or gear box 104. The motor 102 is secured (e.g., fastened, bolted, riveted, mated, adhered) to the housing 104. However, the motor 102 and the housing 104 can be unitary. The housing 104 includes an inner cavity 108. The motor 102 is external to the inner cavity 108, but can be internal to the inner cavity 108. The inner cavity 108 is defined in part by an inner surface or wall 106.

The housing 104 houses a worm wheel 110 and a support structure 120 within the inner cavity 108 such that the inner surface 106 encloses or encircles the worm wheel 110 and the support structure 120. The worm wheel 110 and the support structure 120 extend within the housing 104. A support structure such as the support structure 120 may also be referred to as a gear guide.

The worm wheel 110 is a component of a worm drive, as further described below. The worm wheel 110 includes or is made of plastic (e.g., thermoplastic, synthetic polymer, nylon, polyoxymethylene), but can include other materials, whether additionally or alternatively. For example, the worm wheel 110 can include or be made of rubber, metal, or other materials, whether natural or artificial. Preferably, the worm wheel is made of or includes polyxymethylene. It is available under the brand name DELRIN.® The worm wheel 110 is a single monolithic piece (e.g., injection molded), but can be an assembly of pieces (secured to together by, e.g., fastening, adhering, mating).

The worm wheel 110 includes a disc or wheel 112 and a boss 114 on the wheel 112. The wheel 112 includes a first side (e.g., a top side), a second side (e.g., a bottom side), and a third side (e.g., a lateral side), where the first side opposes the second side, and the third side spans between the first side and the second side. The third side hosts a set of gear teeth (e.g., acutely inclined, obtusely inclined, perpendicularly inclined), for use in the worm drive as further explained below. The wheel 112 (e.g., the second side) may contact, preferably avoids, contact with the inner surface 106 when rotating within the inner cavity 108. The boss 114 outwardly projects (e.g., extends) from the wheel 112 such that the wheel 112 and the boss 114 form a top hat shape or a sunhat shape. As described below, and as better seen in FIGS. 3, 5, 6a, and 6b, a driven spur gear such as wheel 112 may include, and preferably includes, a recess in the first side in which the boss 114 is seated and from which the boss 114 projects. This enables a taller boss structure that need only project minimally, if at all, above an plane defined by an outer peripheral edge of the driven spur gear. Note that the boss 114 can be monolithic (e.g., injection molded, 3d printed) with the driven spur gear or can be assembled (e.g., fastened, mated, adhered) with the driven spur gear.

The boss supports a displacement sensor element 116, which preferably is a magnet. Alternatively, a displacement sensor element such as an optically encoded disc could be used. The manner in which a displacement sensor element is supported will depend on the type of element.

In this embodiment, the boss 114 includes a well 118 within which the sensor element, which in this example is a magnet, 116 is received such that the magnet 116 is embedded within the boss 114 and thereby flush with the boss 114. However, note that the magnet 116 can avoid being embedded within the boss 114 or avoid being flush with the boss 114. The magnet 116 is secured (e.g., snap-fit, fastened, bolted, riveted, mated, adhered) to the boss 114 (e.g., within the well 118).

The support structure 120 includes or can be made of plastic (e.g., thermoplastic, synthetic polymer, nylon, polyoxymethylene), but can include other materials, whether additionally or alternatively. For example, the support structure 120 can include or be made of rubber, metal, shape-memory, or other materials, whether natural or artificial. Preferably, the support structure 120 is made of or includes nylon. The support structure 120 is a single monolithic piece (e.g., injection molded, 3D printed), but can be an assembly of pieces (e.g., fastening, adhering, mating). The support structure 120 is secured against rotation relative to the housing 104 and the worm wheel 110.

With respect to the selection of material(s) of which the support structure 120 and the worm wheel 110 are made, in addition to durability, a major consideration is the extent to which a good bearing surface can be provided between the support structure 120 and the worm wheel 110.

The support structure 120 includes a ring 122 and a set of legs 124 that extend laterally within the housing 104, i.e., they extend in a direction perpendicular to an axis of the worm wheel 110. The ring 122 is symmetrical along an axis of symmetry or an axis of rotation. However, the ring 122 can be asymmetrical along an axis of symmetry or an axis of rotation. The ring 122 includes a bearing surface 128 defining an opening 126 within the ring 122, where the opening 126 is sized to receive the boss 114 therein. The ring 122 has a uniform height, but the ring 122 can have a non-uniform height. Regardless, the ring 122 is structured to act as a wall, thereby defining the opening 126 and containing the boss 114 within the opening 126 such that the boss 114 can rotate within the opening 126 when the worm wheel 110 is rotating, as further described below. Likewise, the magnet 116 extends within the opening 126 such that the boss 114 can rotate within the opening 126 when the worm wheel 110 is rotating. However, note that if the boss 114 projects above the ring 122, then the magnet 116 can avoid extending within the opening 126. Further, note that although the ring 122 has a circular shape, the ring 122 can be shaped differently. For example, the ring 122 can have a closed shape (e.g., oval, square, rectangle triangle, pentagon, hexagon), whether the closed shape is symmetrical or asymmetrical along an axis of symmetry or an axis of rotation. Likewise, the ring 122 can have an open shape (e.g., U-shape, J-shape, V-shape, W-shape, S-shape), whether the open shape is symmetrical or asymmetrical along an axis of symmetry or an axis of rotation.

Each leg 124 radially extends from the ring 122 such that the each leg 124 spans between the housing 104 (e.g., the inner surface 106) and the ring 122, while contacting the housing 104 (e.g., the inner surface 106). For example, at least some of the legs 124 can friction fit against the housing 104 (e.g., the inner surface 106). each leg 124 can be supported within a respective well or receptacle formed within the inner surface 106 or retained jointly and a ledge 105 peripherally extending along the housing (e.g., the inner surface 106), whether perimetrically or in segments. Note that the ledge can be omitted.

As described below, the support structure is restrained against movement so as not to spin with the worm wheel. This can be accomplished by seating each leg within a respective receptacle or by include structures in the surface 106 or on the ledge 105.

Each leg 124 has a uniform height, but the some legs 124 can have a uniform or a non-uniform height. At least two legs 124 can be identical or non-identical to each other in shape, length, width, height, or material. At least two legs 124 form an acute angle, an obtuse angle, or a perpendicular angle therebetween. At least two legs 124 radially extend from the ring 122 in radially opposing directions. At least two legs 124 are non-parallel to each other, but can be parallel. Although FIG. 1 shows a total of four legs 124, although this amount can be lower (e.g., three, two, one) or higher (e.g., five, six, seven, eight, nine, ten, or more). As shown in FIG. 1, a first pair of legs 124 forms a first acute angle and a second pair of legs 124 forms a second acute angle, where the first acute angle and the second acute angle oppose each other. Likewise, as shown in FIG. 1, a third pair of legs 124 forms a first obtuse angle and a fourth pair of legs 124 forms a second obtuse angle, where the first obtuse angle and the second obtuse angle oppose each other.

As noted above, the housing 104 can have a set of depressions or concavities (e.g., a set of mating features) formed within the inner surface 106. As such, at least some legs 124 (e.g., an end portion distal to the ring 122) can be configured to fit (e.g., snugly, frictionally) into at least some of these depressions/concavities.

Alternatively, instead of the legs 124, the ring 122 or a disk-like member in which the ring 122 is secured or formed, can extend to or towards the interior walls or the inner surface 106 of the gear housing 104. While this type of structure likely uses more material to make than the illustrated support structure 120, and thus would be heavier and material cost inefficient, it has the possible advantage of reducing manufacturing complications resulting from the more complex structure with plural legs. However, in such a structure, the ring 122 or disk-like member would be considered to extend laterally within the housing, i.e., in a direction perpendicular to an axis of the worm wheel.

Figure 2:
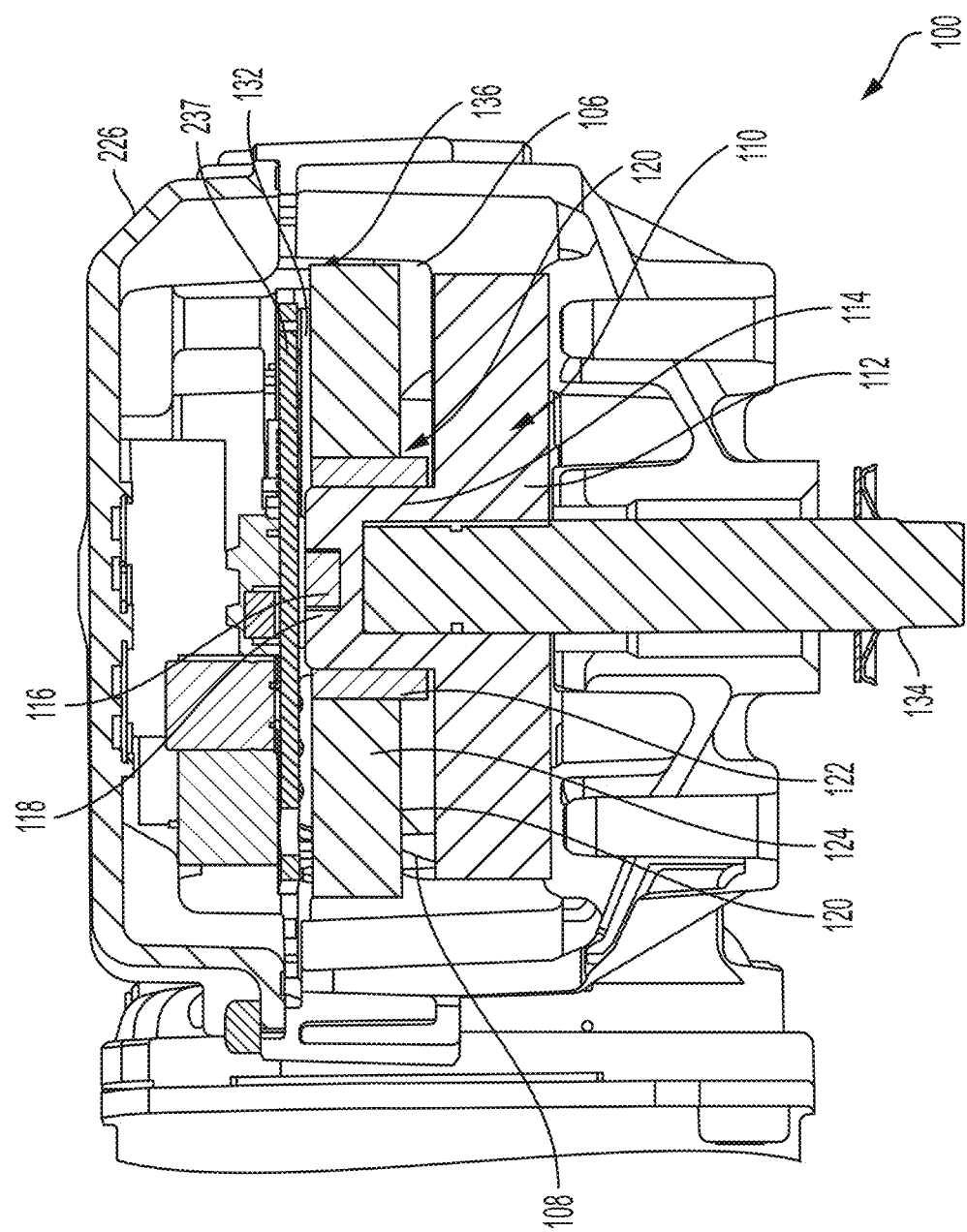
FIG. 2 illustrates a cross-sectional view of the embodiment of FIG. 1.

FIG. 2 illustrates a cross-sectional view of the assembly 100 of FIG. 1. Reference may also be made to the exploded view of an assembly 200 in FIG. 2.

As can be seen, the assembly 100 includes a shaft 134 (e.g., rectilinear) extending into the inner cavity 108 such that the inner surface 106 encloses the shaft 134. The shaft 134 has a proximal end portion and a distal end portion. The shaft 134 is secured (e.g., mounted) to the worm wheel 110 such that the proximal end portion of the shaft 134 extends into the boss 114, the magnet 116 extends on or within the boss 114, and the boss 114 extends between the magnet 116 and the shaft 134. The distal end portion of the shaft 134 extends from the second side of the worm wheel 110 away from the boss 114 while the shaft 134 is secured to the worm wheel 110. As such, the shaft 134 is rotated relative to the motor 102 and the housing 104 via the worm wheel 110 being rotated relative to the motor 102 and the housing 104 via the armature shaft 212 (the worm) being rotated by the motor 102 relative to the motor 102 and the housing 104, as explained herein. Note that the worm wheel 110 and the shaft 134 can be monolithic with each other. The shaft 134 includes or is made of plastic (e.g., thermoplastic, synthetic polymer, nylon, polyoxymethylene), but can include other materials, whether additionally or alternatively. For example, the shaft 134 can include rubber, metal, or other materials, whether natural or artificial. The shaft 134 is a single monolithic piece (e.g., injection molded, 3D printed), but can be an assembly of pieces (e.g., fastening, adhering, mating).

It can be appreciated that the well 118 in which the magnet 116 is received can extend partway to the proximal end of the shaft 134, as illustrated, or completely to the proximal end of the shaft 134. Further, in some embodiments, the shaft itself may extend to the end of the boss and include a concavity or well in which the magnet is received.

The support structure 120 extends within the inner cavity 108 such that there is an air gap 132 formed between a printed circuit board (PCB) 230 and the support structure 120. For example, the support structure 120 can be spaced apart from the PCB 230. For example, the PCB 230 can avoid contact with the support structure 120. For example, the PCB 230 can be separate and distinct from the support structure 120. For example, the support structure 230 can avoid extending through the PCT 230. The support structure 120 extends between the air gap 132 and the wheel 112.

Between the magnet 116 and the PCB 230, there is an air gap 302. The air gap 302 enables the magnet 116 to avoid touching or contacting the PCB 230 or components or parts exposed at a worm wheel facing side of the PCB 230. A cover plate 226 (e.g., a lid) covers the housing or gear box 104 104 and together they enclose PCB 230, the support structure or gear guide 120, and the wheel 110.

As can be appreciated, the boss 114 rotates within the opening 126 relative to the housing 104 and the support structure 120 while the boss 114 faces the bearing surface 128 when the worm wheel 110 rotates based on the motor 102 driving the worm (the armature shaft 212).

The PCB 230 hosts the electronic components, including a processor and memory storing processor executable instructions, or firmware, that implement one or more algorithms to control the motor, and hence one, or more wipers driven by the motor.

Other than via the boss 114, the worm wheel 110 is spaced and sized to avoid contacting the housing 104 and the support structure 120, particularly when rotating relative to the housing 104. For example, the wheel 112 is sized and shaped to avoid contacting the inner surface 106.

As explained above, the housing 104 preferably has the set of depressions (e.g., a set of mating features) formed within the inner surface 106. As such, at least some legs 124 (e.g., an end portion distal to the ring 122) can be configured to fit (e.g., snugly, frictionally) into at least some of these depressions. Also, at least some legs 124 (e.g., an end portion distal to the ring 122) can be configured to fasten to the cover plate 226 around the PCB 230 (e.g., various edge portions or end portions of the PCB 230). For example, the support structure 120 can be is secured to the cover plate 226. Note that the cover plate 226 can avoid pivoting from the housing 104 or can pivot from the housing 104 (e.g., via a hinge pivoting between an open state for providing physical access into the inner cavity 108 and a closed state for preventing physical access into the inner cavity 108). For example, the cover plate 226 can be secured to the housing 104 (e.g., fastened, bolted, riveted, mated, adhered).

Figure 3:
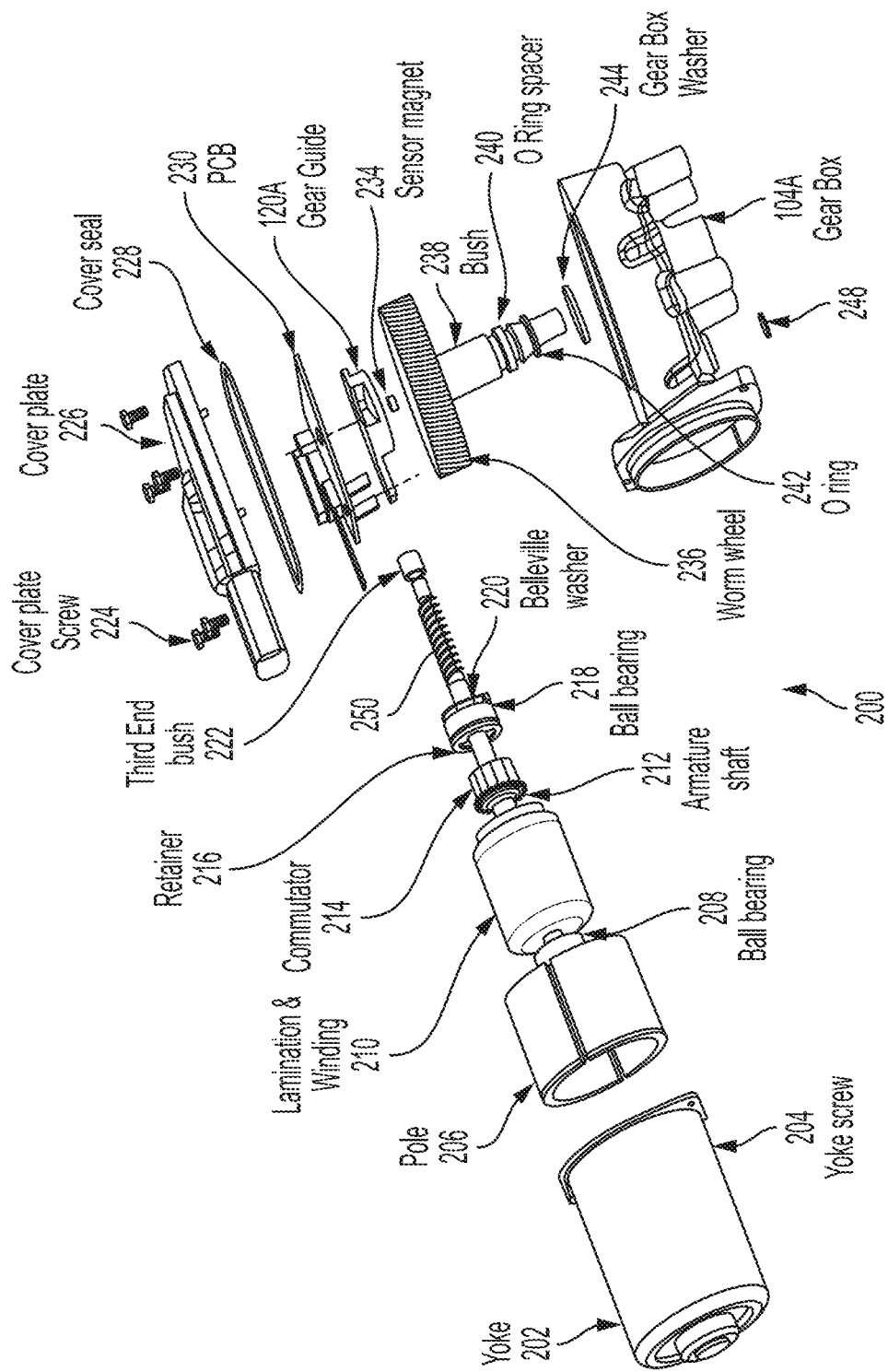
FIG. 3 illustrates an exploded view of an embodiment of an assembly for driving an arm of a windshield wiper of a vehicle, where the assembly includes a support structure according to principles disclosed herein.

FIG. 3 illustrates an exploded view of an embodiment of an assembly 200 for driving an arm of a windshield wiper of a vehicle, where the assembly includes a second support structure 120A according to principles disclosed herein. Parts described above in connection with the assembly 100 may carry the same reference numbers, while newly mentioned or different parts may carry new reference numbers.

In the assembly 200, the motor 102 includes a yoke 202, a yoke screw 204, a pole 206, a ball bearing 208, a lamination and winding 210, an armature shaft 212, a commutator 214, a retainer 216, a ball bearing 218, a belleville washer 220, and a third end bush 222. The armature shaft 212 includes a set of teeth 250 extending between the third end bush 222 and the belleville washer 220.

The set of teeth 250 is configured to mesh with the set of teeth on the third side of the worm wheel 110. As such, the armature shaft 212 is a worm that meshes with the worm wheel 110, thereby forming the worm drive, as mentioned above. The armature shaft 212 extends from the motor 102 into the housing 104 such that the set of teeth 250 meshes with the set of teeth on the third side of the worm wheel 110 when the motor 102 is driven and the set of teeth 250 causes the worm wheel 110 to rotate via the set of teeth on the third side of the worm wheel 110. For example, in the worm drive, the worm (the armature shaft 212) is more rigid than the worm wheel 110, (e.g. the worm includes a rigid metal whereas the worm wheel 110 includes thermoplastic, synthetic polymer, nylon, polyoxymethylene), and preferably is made of or includes polyoxymethylene.

The assembly 200 further include a housing or gear box 104A, cover plate screws 224, the cover plate 226 (e.g., a lid), a cover seal 228, the PCB 230, the support structure or gear guide 120A, a sensor magnet 234, a worm wheel 236, a bush 238, an O-ring spacer 240, an O-ring 242, a gear box washer 244, and a washer 248. The sensor magnet 234 is similar to the magnet 116, and the worm wheel 236 is similar to the worm wheel 110. The cover plate 226 is secured to the gear box 104A via the cover plate screw 224 (or another attachment technique). The gear guide 120A extends between the PCB 230 and the worm wheel 236. T The sensor magnet 234 can be housed in or on the gear guide 120A or the worm wheel 236. Resultantly, the worm drive includes the worm (the armature shaft 212) and the worm wheel 110. The worm drive (the armature shaft 212) extends within the housing 104 (the gear box 104A). The worm (the armature shaft 212) meshes with the worm wheel 110, where the worm (the armature shaft 212) is configured to be driven via the motor 102.

Figure 4A:
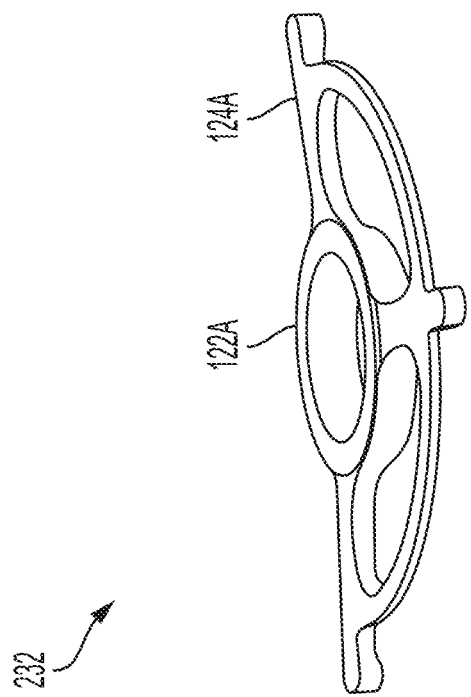
FIGS. 4a and 4b illustrates different views of a second support structure according to principles disclosed herein.
Figure 4B:
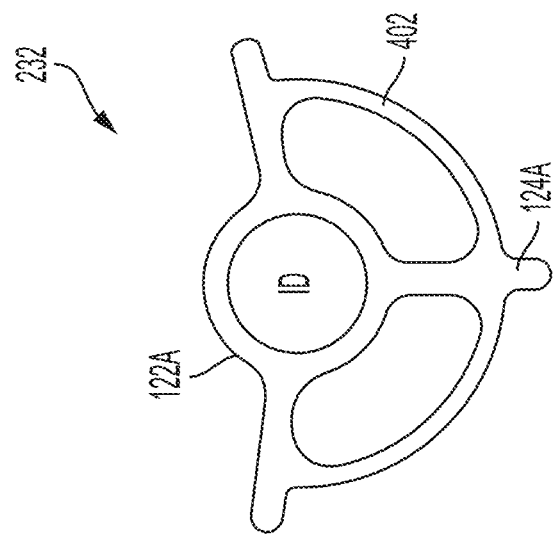
Figure 5:
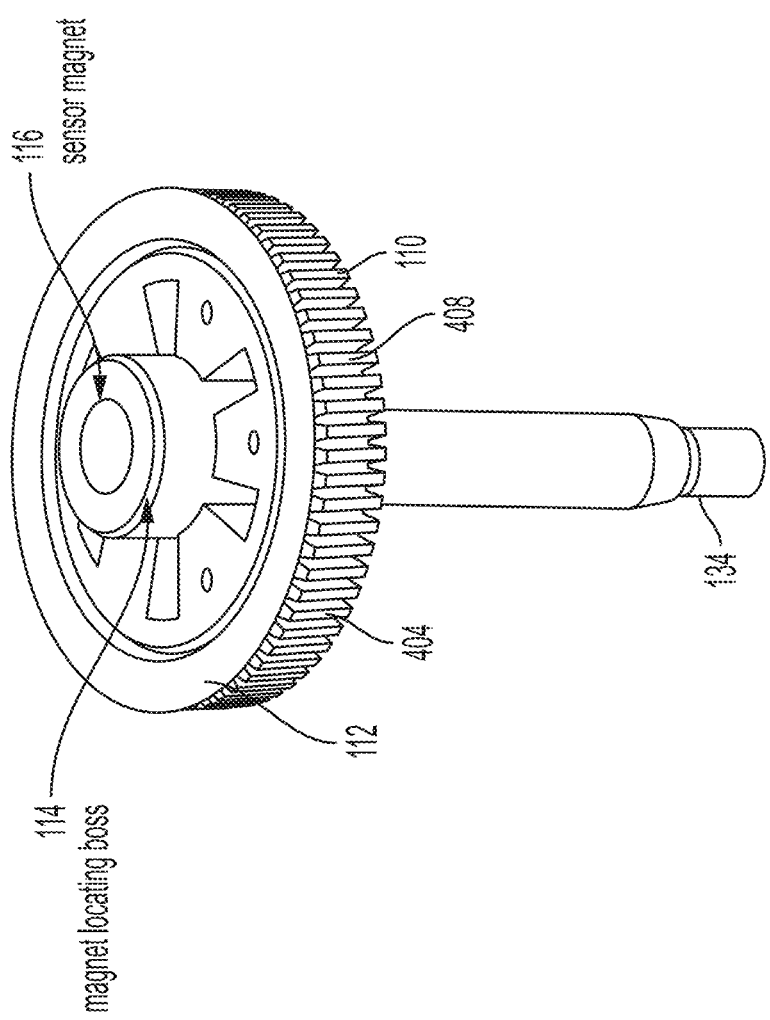
FIG. 5 illustrates a worm wheel or driven spur gear which can be employed in a wiper motor.
Figure 6A:
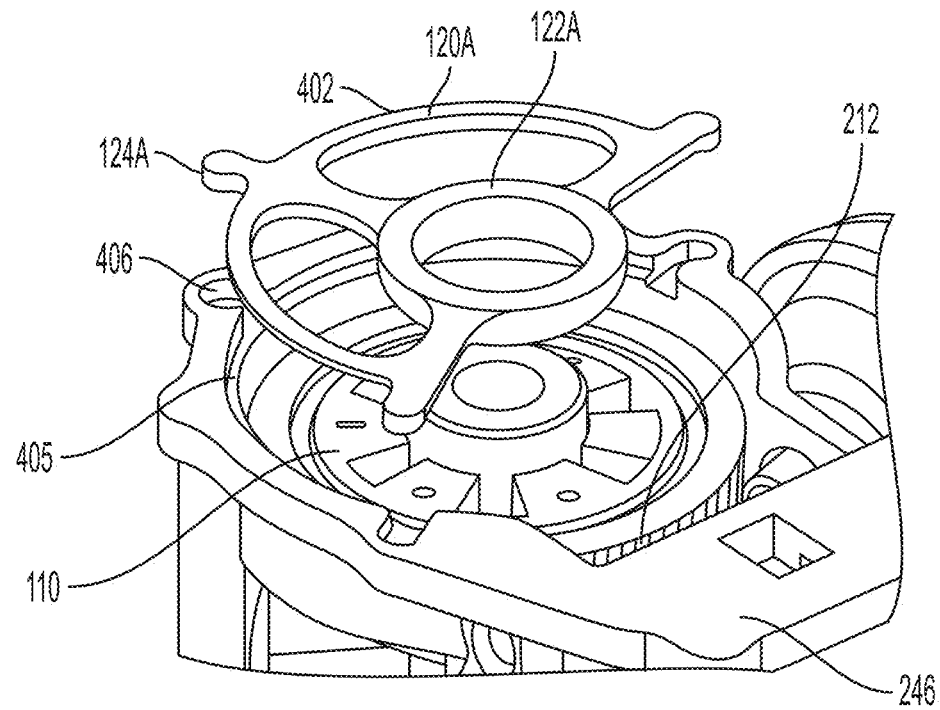
FIGS. 6a and 6b illustrate different views of positioning of the support structure of FIGS. 4a and 4b relative to the worm wheel or driven spur gear of FIG. 5 within a gear housing according to principles disclosed herein.
Figure 6B:
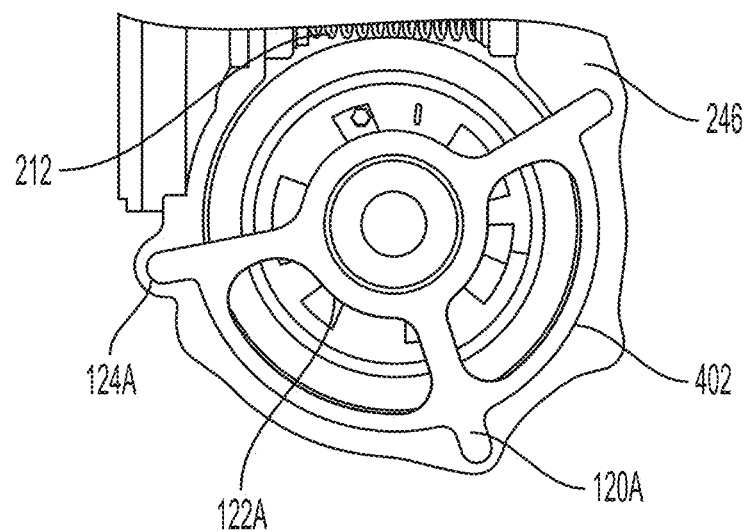

FIGS. 4a and 4b illustrate a plurality of views of the support structure 120A. FIG. 5 illustrates a worm wheel or driven spur gear 110A which can be employed in a wiper motor. FIGS. 6a and 6b illustrate different views of positioning of the support structure 120A of FIGS. 4a and 4b relative to the worm wheel or driven spur gear 110A of FIG. 5 within the gear housing 104A. Together they can be used to illustrate further principles disclosed herein.

Like the support structure 120, the support structure 120A includes a central ring 122A with radially extending legs 124A. In this embodiment there are three legs 124A extending from the central ring 122A. The support structure 120A includes a set of bridges 402 arcuately (in an arc) spanning between the legs 124A in parallel to the ring 122A (although non-arcuate or non-parallel extension is possible). Each of the bridges 402 is respectively monolithic with the legs 124A, but can be secured thereto (e.g., by fastening, mating, adhering). The outer tips of the legs 124A may be rounded, as shown, or rectangular, e.g. as in the legs 124 of the support structure 120 of FIG. 1. The support structure 120A is configured to be used in the assembly 400 of FIGS. 6a and 6b. In the assembly 400, a housing 104A has an interior ledge 405 peripherally and arcuately extending within the housing 104A along the inner surface 106A in parallel to the ring 122A. Therefore, when the gear guide 120A sits within the housing 104A, the bridges 402 rest on the ledge 405, while contacting or avoiding contact with the wheel 112.

The gear box 104A includes a set of depressions 406 that radially extend outward from the ledge 405. The depressions 406 are configured to receive the distal ends of legs 124, while the bridges 402 rest on the ledge 405, in order to ensure that the gear guide 120A securely rests within the housing 104A and does not rotate with the worm wheel. For example, such receipt can be frictional or snugly. Therefore, as explained above, the gear box 104A has the set of depressions 406 (e.g., a set of mating features) formed within the inner surface 106A of the gear box 104A, while the set of depressions 406 radially extends outward from the ledge 405.

As explained above, the worm wheel 110 has a lateral side 404 hosting a set of gear teeth 408 (e.g., acutely inclined, obtusely inclined, perpendicularly inclined), for use in the worm drive, as explained above. Therefore, the set of gear teeth 408 meshes with the set of gear teeth 250 of the armature shaft 212, as driven via the motor 102.

Figure 7:
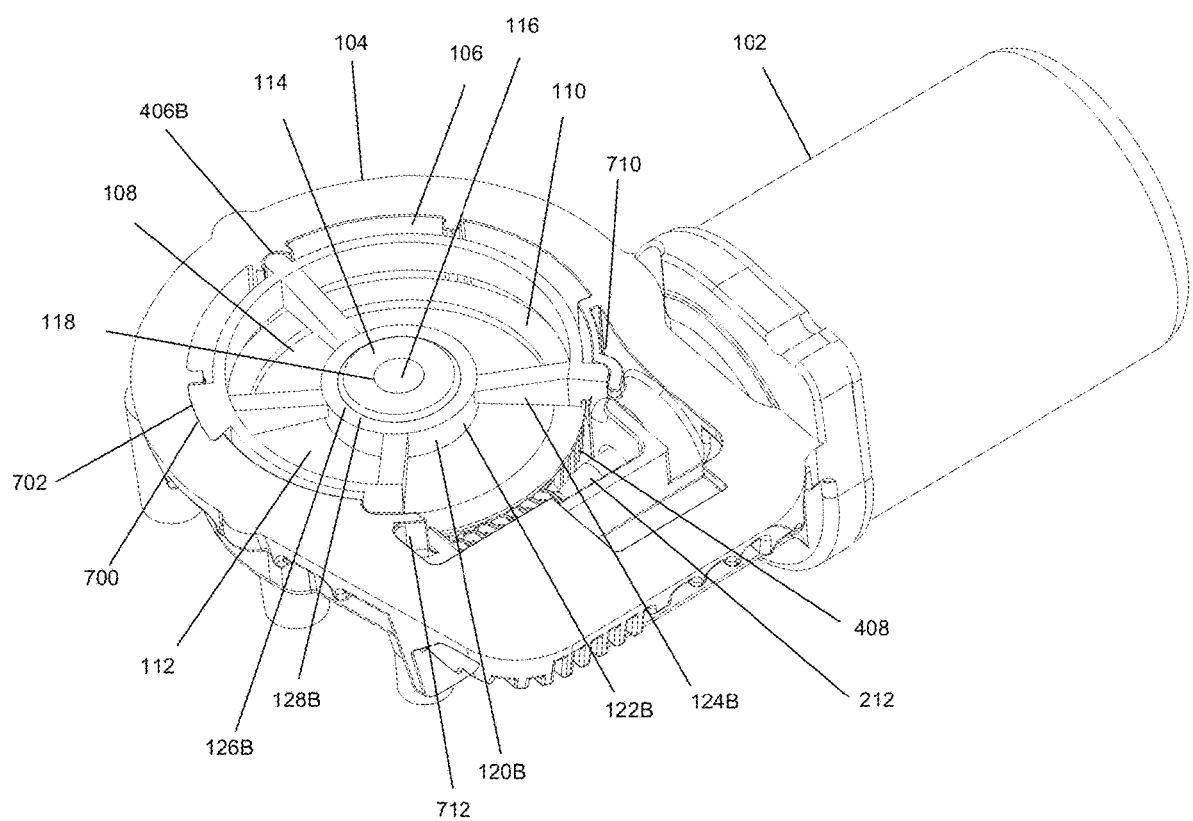
FIG. 7 shows a perspective view of an embodiment of an assembly for driving an arm of a windshield wiper of a vehicle, where the assembly includes a third support structure according to principles disclosed herein.
Figure 8:
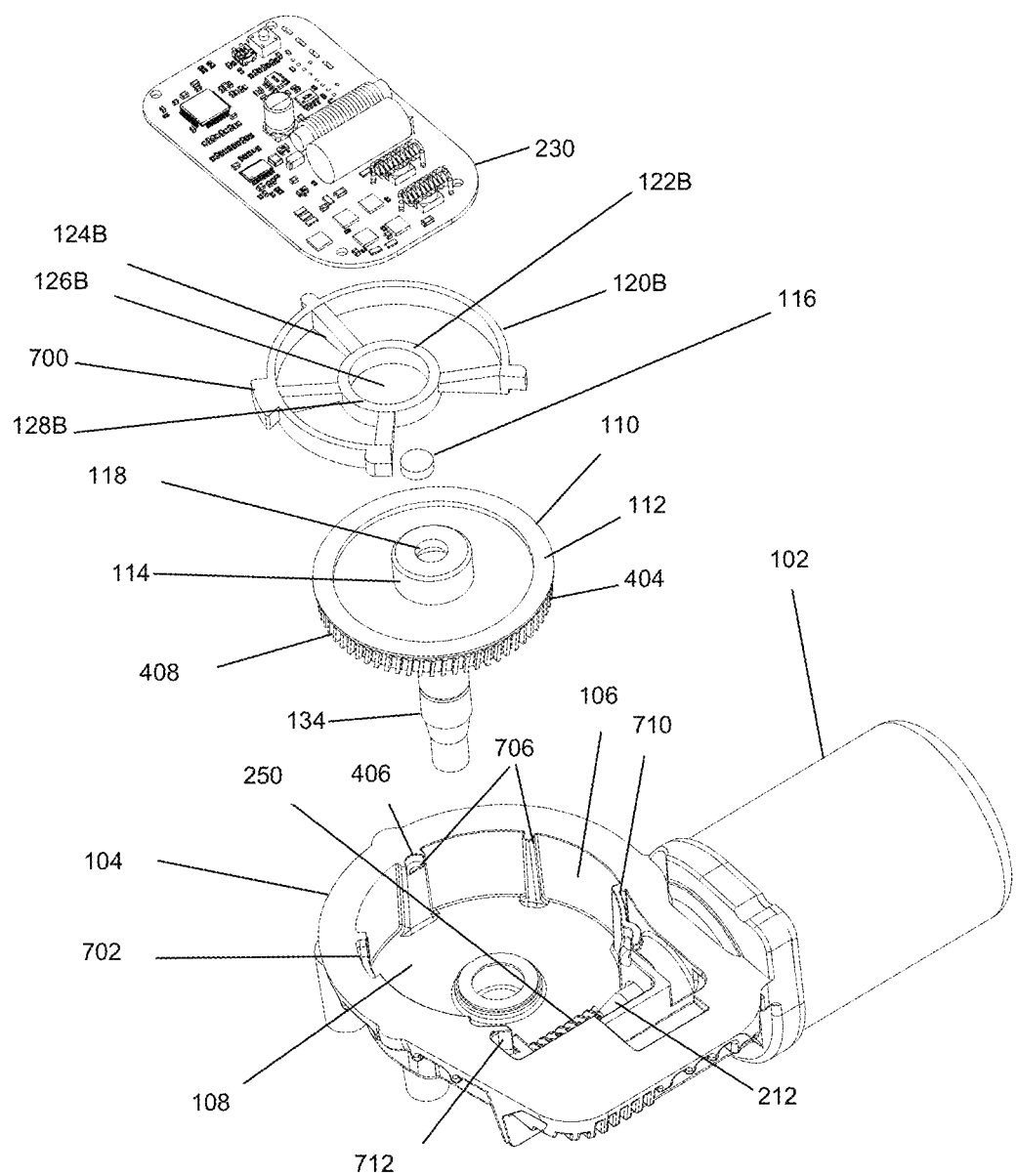
FIG. 8 shows an exploded view of the assembly of FIG. 7.
Figure 9:
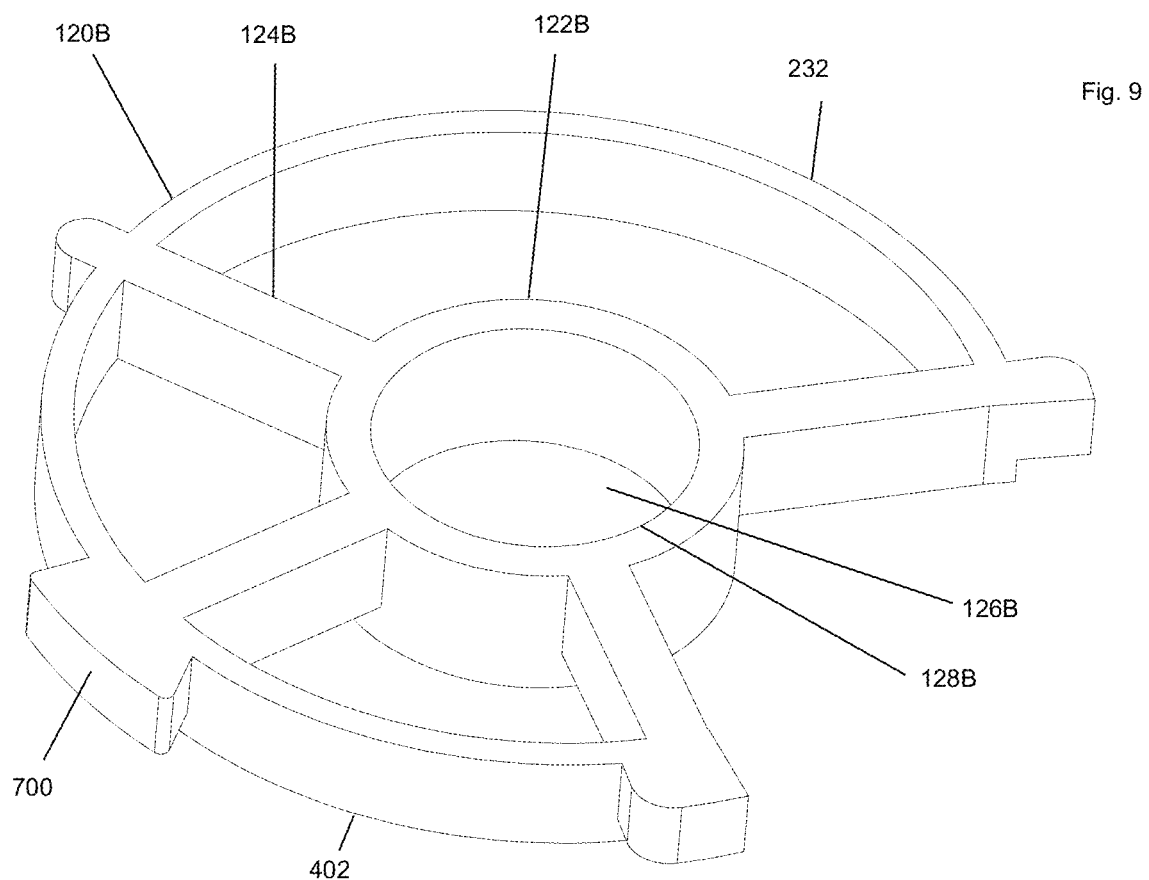
FIG. 9 shows a perspective view of a support structure of FIG. 7.
Figure 10:
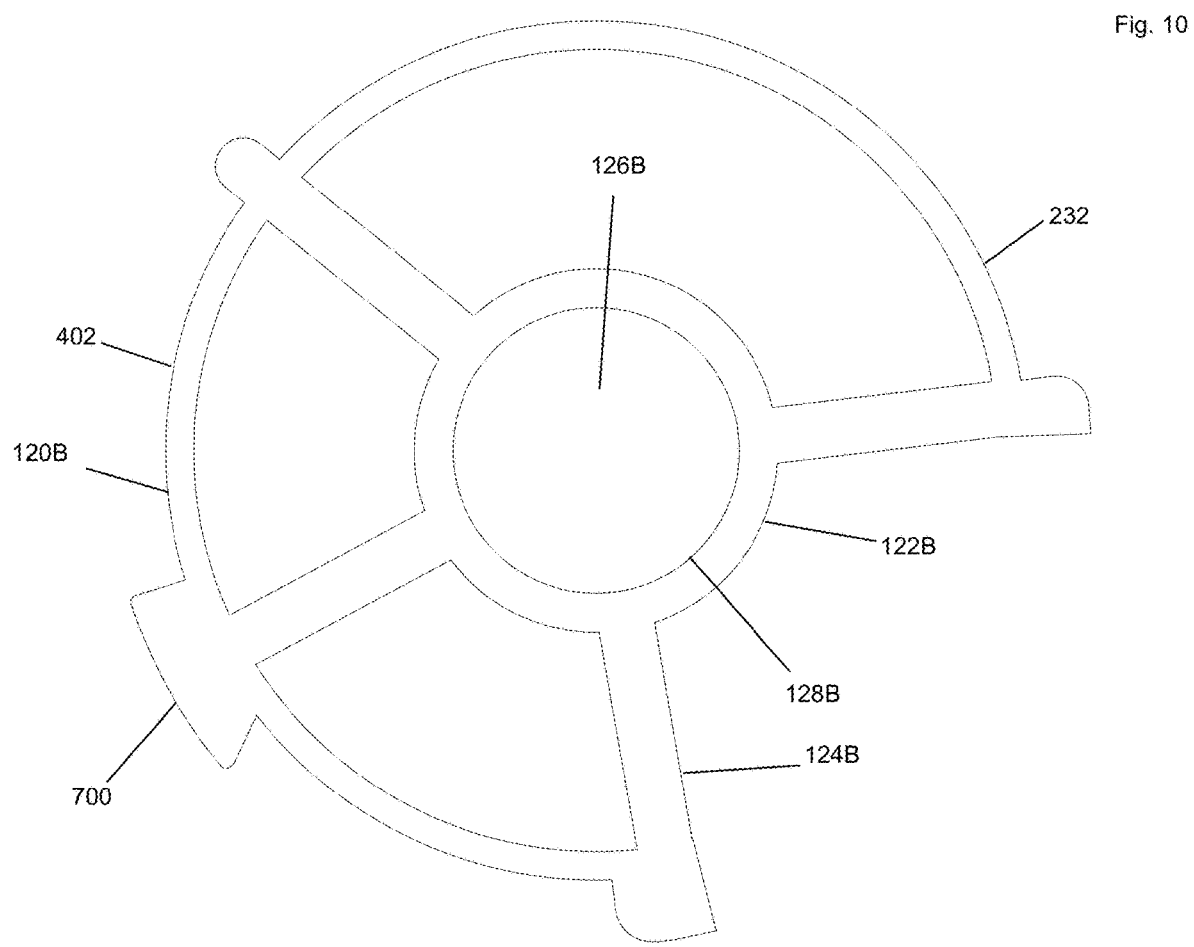
FIG. 10 shows a top view of the support structure of FIG. 9.
Figure 11:
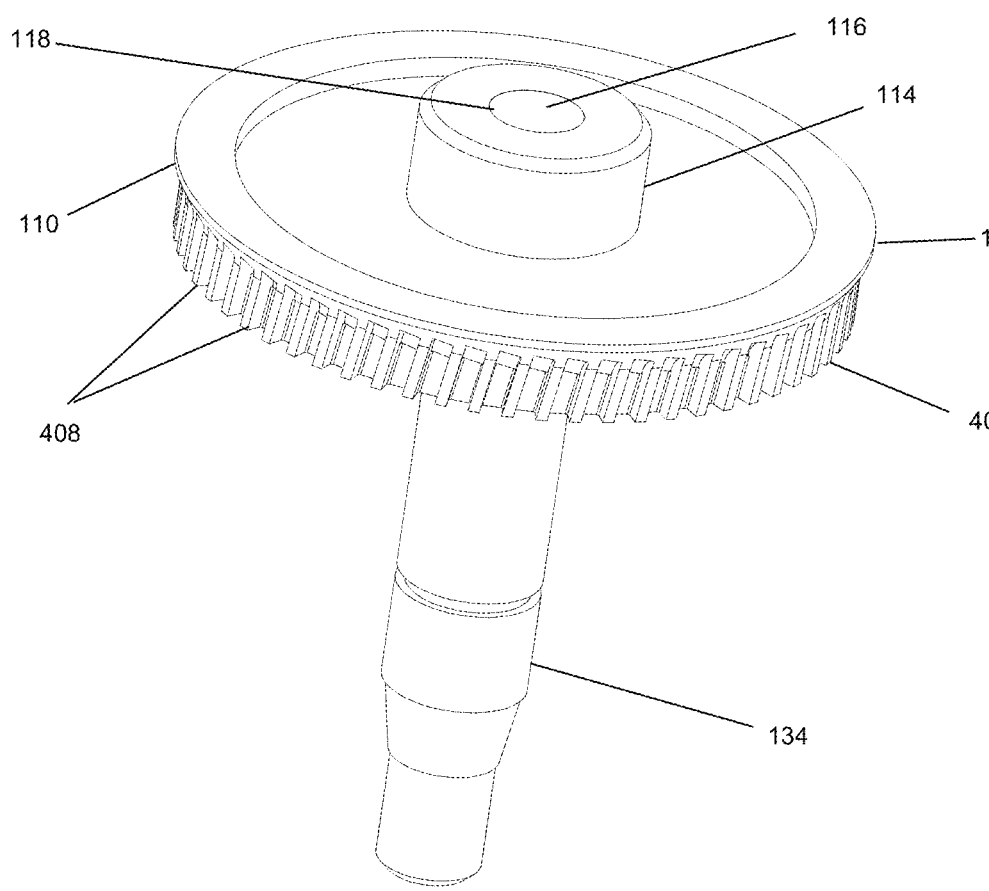
FIG. 11 shows a worm wheel or driven spur gear which is employed in a wiper motor of FIG. 7.
Figure 12:
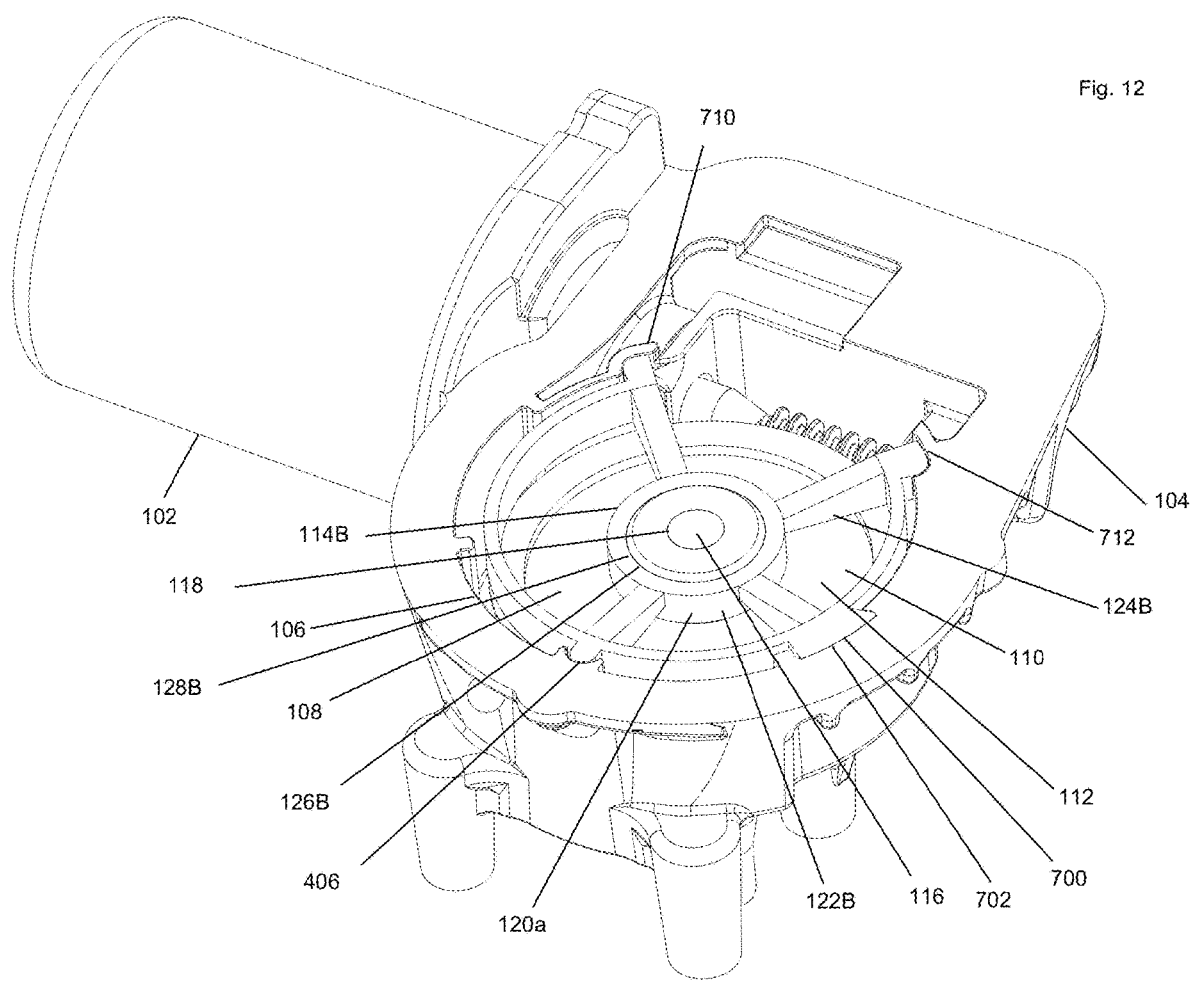
FIG. 12 shows a perspective view of the assembly of FIG. 7.
Figure 13:
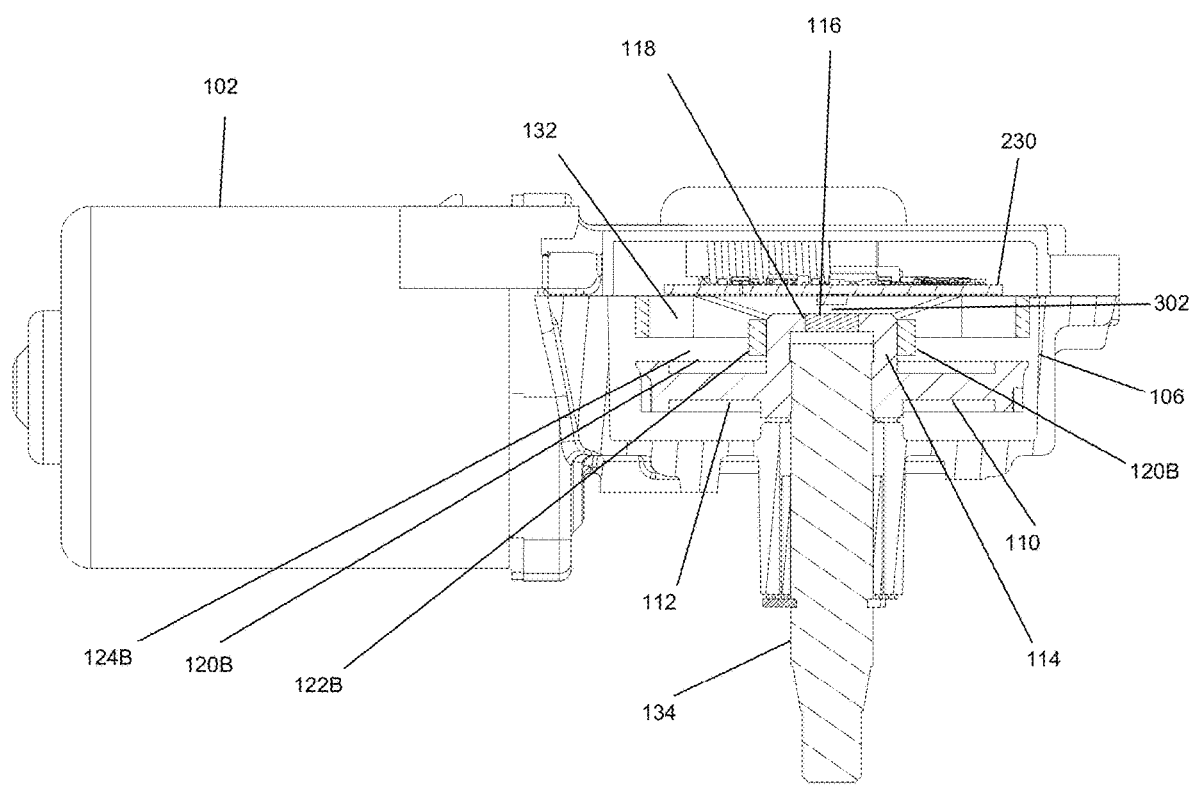
FIG. 13 shows a cross-sectional view of the assembly of FIG. 7.
Figure 14:
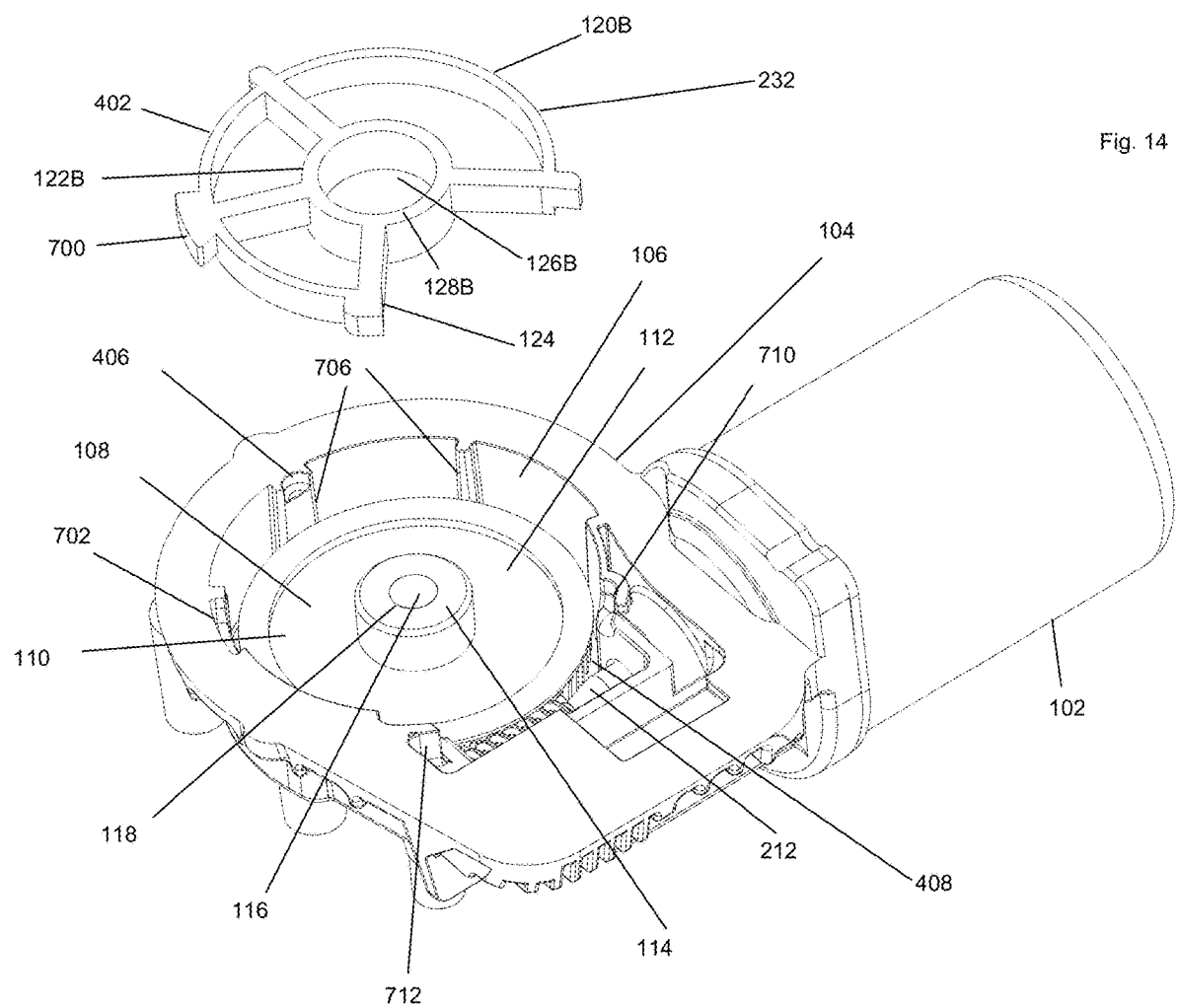
FIG. 14 shows the support structure of FIG. 9 external to the assembly of FIG. 7.

FIG. 7 shows a perspective view of an embodiment of an assembly 700 for driving an arm of a windshield wiper of a vehicle, where the assembly includes a third support structure 120B according to principles disclosed herein. FIG. 8 shows an exploded view of the assembly 700 of FIG. 7. FIG. 9 shows the support structure 120B by itself in perspective view. FIG. 10 shows and upper side plan view of the support structure 120B. FIG. 11 shows a worm wheel or driven spur gear which is employed in a wiper motor of FIG. 7. FIG. 12 shows another perspective view of the assembly 700 of FIG. 7. FIG. 13 shows a cross-sectional view of the assembly 700 of FIG. 7. FIG. 14 shows the support structure 120B external to the assembly 700 of FIG. 7. The support structure 120B has four legs 124B and three bridges 402B, a section that is not spanned by a bridge 402B (although that is possible).

The support structure 120B also includes a key 702 at an outer perimeter thereof, preferably extending from one of the legs 124B or one of the bridges 402B. In the embodiment of FIG. 7, the key 702 is positioned at the end of a leg 124B where two bridges 402B meet. The, the key 702 spans between the two bridges 402B while radially extending outward away from the ring 122B and the two bridges 402B. The key 702 has a vertical height corresponding to a vertical height of each of the bridges 402B, although these vertical heights can differ from each other. The key 702 is monolithic with the leg 124B and each of the bridges 402B (e.g., molded, cast, 3D printed). However, the key 702 can be assembled with the leg 124B and each of the bridges 402B (e.g., mated, fastened, interlocked, adhered). The key 702 includes or can be made of or includes plastic (e.g., thermoplastic, synthetic polymer, nylon, polyoxymethylene), but can include other materials, whether additionally or alternatively. For example, the key 702 can include or be made of rubber, metal, shape-memory, or other materials, whether natural or artificial. Preferably, the key 702 is made of or includes nylon.

The housing 106B has a cavity or depression 704 formed in an inner wall of the housing to matingly receive the key 702. The depression 70 extends radially outward away from the ring 122B. When the key 702 is not in the depression 704, the depression 704 faces or is exposed to the boss 114 (e.g., a sidewall thereof). Likewise, the housing 106B includes a set of columns or pillars 706 each having an upper portion hosting a respective well 406 configured to receive a respective leg 124. The set of columns or pillars 706 is monolithic with the housing 106B (e.g., molded, cast, 3D printed). However, the set of columns or pillars 706 can be assembled with the housing 106B (e.g., mated, fastened, interlocked, adhered). The set of columns or pillars 706 includes or can be made of or includes plastic (e.g., thermoplastic, synthetic polymer, nylon, polyoxymethylene), but can include other materials, whether additionally or alternatively. For example, the set of columns or pillars 706 can include or be made of rubber, metal, shape-memory, or other materials, whether natural or artificial. Note that this key/depression configuration can be reversed, where the housing 106B includes a key and the support structure 120B includes the cavity/depression.

As also can be seen, to support the support structure 120B, the interior of the housing of the assembly 700 includes extensions 710 and 712 that include respective cavities or notches within with are received respective legs 124B of the support structure 122B. In this embodiment, the legs 124B are separated from each other so that one of them extends into a space adjacent to the space in which the worm is located, and does not extend into the rim of the inner wall or surface. This leg 124B is supported by the extension 710. The extension 710 extends from and is attached to or molded with the inner wall or surface 106. The extension 712 is an extension and continuation of the inner wall 106 that includes the cavity or notch.

Figure 15:
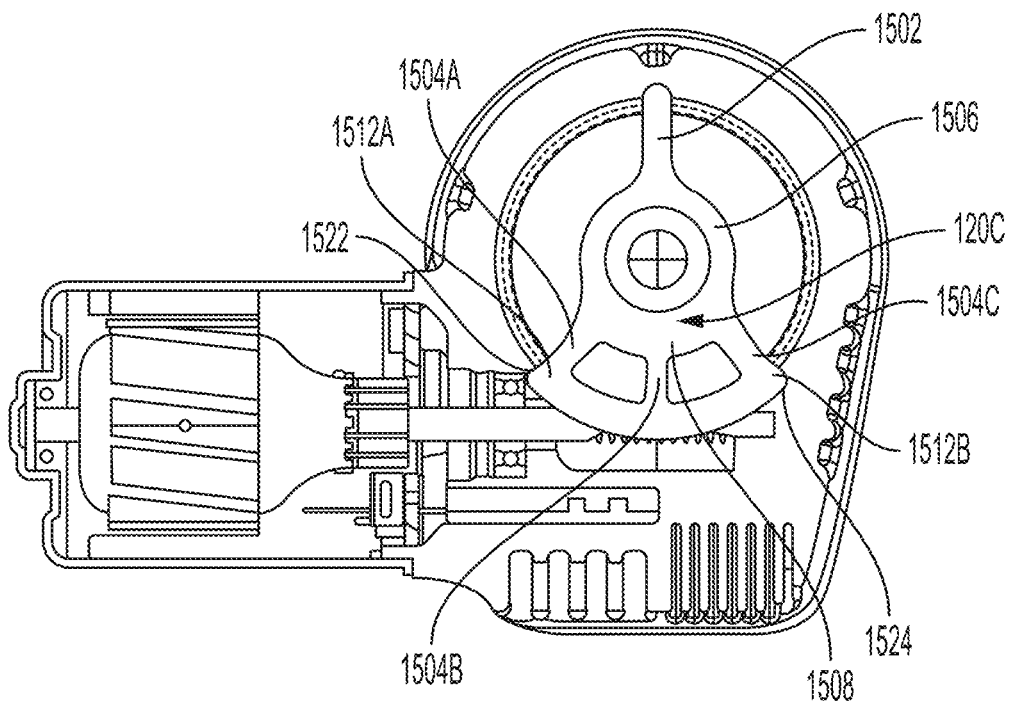
FIG. 15 shows a third support structure in plan view and positioned in a gear box.
Figure 16:
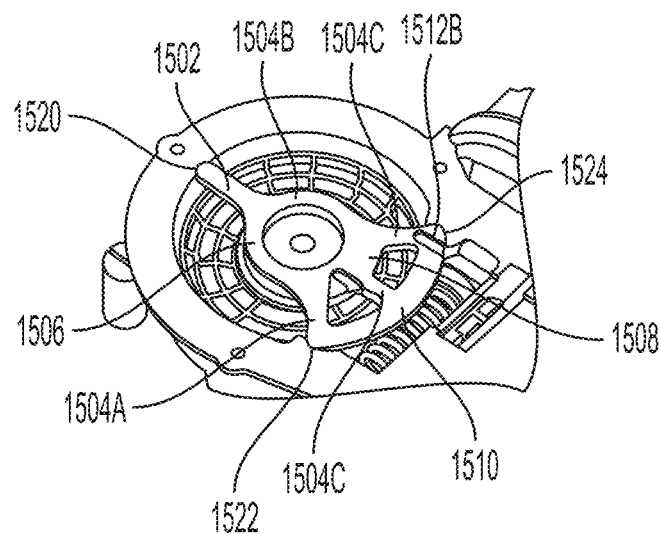
FIG. 16 shows the third support structure positioned in the gear box in perspective view.

In FIGS. 15 and 16, there is illustrated yet another support structure 120C. FIG. 15 shows the support structure 120C positioned in a gear box in plan view while FIG. 16 shows the support structure 120C positioned in the gear box in perspective view.

The support structure 120C includes a ring 1506 from which extend a main leg 1502 and three offshoot legs 1504A, 1504B, and 1504C. The ring 1506 includes a laterally wider portion 1508 from which the offshoot legs extend, thereby providing more support for those legs to enhance the overall stability of the support structure 120C.

The end of the offshoot legs 1504A, 1504B, and 1504C terminate and are unitary with an arcuate member 1510. The ends of the offshoot legs 1504A and 1504C terminate at corners 1512A and 1512B, respectively, and as can be seen, provide rounded corners to the circumferential ends of the arcuate member 1510. The end of the main leg 1502 is received within a mating recess or notch 1520 in the wall of the gear box housing surrounding the wheel gear. The ends of the offshoot legs 1504A and 1504C (and, hence, the circumferential ends of the arcuate member 1510, are received in mating recesses or notches 1522 and 1524, respectively. The arcuate member 1510 spans between the recesses/notches 1522 and 1524 and the open space between them so that the offshoot leg 1504B is supported by the arcuate member 1510. As can be seen, the arcuate member 1510 overlies the worm of the worm gear.

As can be appreciated, in plan view, the support structure 120C imparts an overall impression of a "Y" shape, but with a leg between the two upper legs of the "Y" shape. That is the offshoot leg 1504B provides the third leg. This is due to the relatively short circumferential distance between the offshoot legs 1504A and 1504C as they form an acute angle between them while the main leg 1502 forms an obtuse angle between it and each of the offshoot legs 1504A and 1504C.

In the herein described embodiments, the support structures 120, 120A, 120B, and 120C preferably are distinct inserts that are separate from the housing 104 and the PCB 230. Since no opening or openings are required in the PCB 230 to accommodate a structure extending therethrough, that portion of the PCB 230 that otherwise would have the openings can be used for circuitry and the like. Further, the need to design circuits and wring around the openings is eliminated. This makes the design of the PCB 230 more flexible and efficient.

It can be appreciated that the features of the different embodiments and assemblies can be used in each other as is needed. Thus, a feature or structure described in connection with one assembly or embodiment is not limited to that assembly or embodiment it would be useful in another embodiment. One of ordinary skill in the art would recognize how to incorporate a feature or structure of one assembly or embodiment in another.

Each of the assembly 100, the assembly 200, and the assembly 400 can be used with a vehicle. The vehicle can be a land vehicle, whether manned or unmanned, whether non-autonomous, semi-autonomous, or fully autonomous. For example, the vehicle can include a car/automobile, a sports utility vehicle (SUV), a van, a minivan, a limousine, a bus, a truck, a trailer, a tank, a tractor, a motorcycle, a heavy equipment vehicle, or others. The vehicle can be an aerial vehicle (e.g., an airplane, a helicopter) or a marine vehicle (e.g., a boat, a submarine).

Note that features described with respect to certain embodiments can be combined and sub-combined in and/or with various other embodiments. Also, different aspects and/or elements of embodiments, as disclosed herein, can be combined and sub-combined in a similar manner as well. Further, some embodiments, whether individually and/or collectively, can be components of a larger system, wherein other procedures can take precedence over and/or otherwise modify their application. Additionally, a number of steps can be required before, after, and/or concurrently with embodiments, as disclosed herein. Note that any and/or all methods and/or processes, at least as disclosed herein, can be at least partially performed via at least one entity in any manner.

Embodiments of this disclosure are described herein with reference to illustrations of idealized embodiments (and intermediate structures) of this disclosure. As such, variations from various illustrated shapes as a result, for example, of manufacturing techniques and/or tolerances, are to be expected. Thus, various embodiments of this disclosure should not be construed as necessarily limited to various particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing, and/or other any other types of manufacturing. For example, some manufacturing processes include three dimensional (3D) printing, laser cutting, computer numerical control routing, milling, pressing, stamping, vacuum forming, hydroforming, injection molding, lithography, and so forth.

Any and/or all elements, as disclosed herein, can be and/or include, whether partially and/or fully, a solid, including a metal, a mineral, an amorphous material, a ceramic, a glass ceramic, an organic solid, such as wood and/or a polymer, such as rubber, a composite material, a semiconductor, a nanomaterial, a biomaterial and/or any combinations thereof. Any and/or all elements, as disclosed herein, can be and/or include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, opaqueness, luminescence, reflection, phosphorescence, anti-reflection and/or holography, a photo-sensitive coating, an electronic and/or thermal property coating, such as for passivity, insulation, resistance or conduction, a magnetic coating, a water-resistant and/or waterproof coating, a scent coating and/or any combinations thereof. Any and/or all elements, as disclosed herein, can be rigid, flexible, and/or any other combinations thereof. Any and/or all elements, as disclosed herein, can be identical and/or different from each other in material, shape, size, color and/or any measurable dimension, such as length, width, height, depth, area, orientation, perimeter, volume, breadth, density, temperature, resistance, and so forth.

Unless otherwise defined, all terms (including technical and scientific terms) used herein have the same meaning as commonly understood by one of ordinary skill in an art to which this disclosure belongs. Various terms, such as those defined in commonly used dictionaries, should be interpreted as having a meaning that is consistent with a meaning in a context of a relevant art and should not be interpreted in an idealized and/or overly formal sense unless expressly so defined herein.

Furthermore, relative terms such as "below," "lower," "above," and "upper" can be used herein to describe one element's relationship to another element as illustrated in the set of accompanying illustrative drawings. Such relative terms are intended to encompass different orientations of illustrated technologies in addition to an orientation depicted in the set of accompanying illustrative drawings. For example, if a device in the set of accompanying illustrative drawings were turned over, then various elements described as being on a "lower" side of other elements would then be oriented on "upper" sides of other elements. Similarly, if a device in one of illustrative figures were turned over, then various elements described as "below" or "beneath" other elements would then be oriented "above" other elements. Therefore, various terms "below" and "lower" can encompass both an orientation of above and below.

As used herein, a term "about" and/or "substantially" refers to a +/−10% variation from a nominal value/term. Such variation is always included in any given value/term provided herein, whether or not such variation is specifically referred thereto.

If any disclosures are incorporated herein by reference and such disclosures conflict in part and/or in whole with this disclosure, then to an extent of a conflict, if any, and/or a broader disclosure, and/or broader definition of terms, this disclosure controls. If such disclosures conflict in part and/or in whole with one another, then to an extent of a conflict, if any, a later-dated disclosure controls.

This detailed description has been presented for various purposes of illustration and description, but is not intended to be fully exhaustive and/or limited to this disclosure in various forms disclosed. Many modifications and variations in techniques and structures will be apparent to skilled artisans, without departing from a scope and spirit of this disclosure as set forth in various claims that follow. Accordingly, such modifications and variations are contemplated as being a part of this disclosure.

What is claimed is:

1. An apparatus comprising:
   a motor;
   a housing secured to the motor;
   a worm drive including a worm and a worm wheel, the worm extending within the housing and meshing with the worm wheel, the worm being connected to be driven by the motor, the worm wheel including a first side and a second side opposing the first side, the first side including a boss outwardly projecting therefrom;
a shaft extending from the second side away from the boss, the shaft having a proximal end portion secured to the worm wheel and a distal end portion extending away from the second side;
a support structure extending laterally within the housing relative to an axis of the shaft, the support structure being secured against rotation relative to the housing and the worm wheel, the support structure including an opening with a bearing surface within which the boss is received, the boss being rotatable within the opening and relative to the housing and the support structure the worm wheel being supported at the boss by the support structure; and
a circuit board extending within the housing such that (a) the support structure extends between the worm wheel and the circuit board and (b) the worm wheel rotates relative to the circuit board, wherein the circuit board faces the support structure with an air gap between the circuit board and the support structure, the support structure does not extend through the circuit board.

2. An apparatus comprising:
a motor;
a housing secured to the motor;
a worm drive including a worm and a worm wheel, the worm extending within the housing and meshing with the worm wheel, the worm being connected to be driven by the motor, the worm wheel including a first side and a second side opposing the first side, the first side including a boss outwardly projecting therefrom;
a shaft extending from the second side away from the boss, the shaft having a proximal end portion secured to the worm wheel and a distal end portion extending away from the second side; and
a support structure extending laterally within the housing relative to an axis of the shaft, the support structure being secured against rotation relative to the housing and the worm wheel, the support structure including an opening with a bearing surface within which the boss is received, the boss being rotatable within the opening and relative to the housing and the support structure the worm wheel being supported at the boss by the support structure,
wherein:
the housing includes a sidewall,
the support structure comprises a ring and a set of legs, and
each leg of the set of legs extends radially from the ring such that the each leg spans between the sidewall and the ring.

3. An apparatus comprising:
a motor;
a housing secured to the motor;
a worm drive including a worm and a worm wheel, the worm extending within the housing and meshing with the worm wheel, the worm being connected to be driven by the motor, the worm wheel including a first side and a second side opposing the first side, the first side including a boss outwardly projecting therefrom;
a shaft extending from the second side away from the boss, the shaft having a proximal end portion secured to the worm wheel and a distal end portion extending away from the second side;
a support structure extending laterally within the housing relative to an axis of the shaft, the support structure being secured against rotation relative to the housing and the worm wheel, the support structure including an opening with a bearing surface within which the boss is received, the boss being rotatable within the opening and relative to the housing and the support structure the worm wheel being supported at the boss by the support structure; and
a magnet on the boss.

4. The apparatus of claim 3, wherein the magnet is embedded within the boss.

5. The apparatus of claim 4, wherein the magnet is flush with the boss.

6. The apparatus of claim 1, wherein the proximal end portion of the shaft is embedded in the worm wheel.

7. The apparatus of claim 1, wherein the housing includes an inner surface enclosing the boss, wherein the support structure contacts the inner surface.

8. An apparatus comprising:
a motor;
a housing secured to the motor;
a worm drive including a worm and a worm wheel, the worm extending within the housing and meshing with the worm wheel, the worm being connected to be driven by the motor, the worm wheel including a first side and a second side opposing the first side, the first side including a boss outwardly projecting therefrom;
a shaft extending from the second side away from the boss, the shaft having a proximal end portion secured to the worm wheel and a distal end portion extending away from the second side; and
a support structure extending laterally within the housing relative to an axis of the shaft, the support structure being secured against rotation relative to the housing and the worm wheel, the support structure including an opening with a bearing surface within which the boss is received, the boss being rotatable within the opening and relative to the housing and the support structure the worm wheel being supported at the boss by the support structure,
wherein:
the support structure includes a closed shape, a first leg, and a second leg,
the first leg radially extends from the closed shape,
the first leg contacts the housing, and
the second leg radially extends from the closed shape, wherein the second leg contacts the housing.

9. The apparatus of claim 8, wherein the first leg and the second leg form an acute angle therebetween.

10. The apparatus of claim 8, wherein the first leg and the second leg form an obtuse angle therebetween.

11. The apparatus of claim 8, wherein the first leg radially extends in a first radial direction, and the second leg radially extends in a second radial direction, wherein the first radial direction opposes the second radial direction.

12. The apparatus of claim 8, wherein the first leg and the second leg are not parallel.

13. The apparatus of claim 8, wherein:
the support structure includes a third leg and a fourth leg, wherein the third leg radially extends from the closed-shape,
the third leg contacts the housing,
the fourth leg radially extends from the closed-shape, and
the fourth leg contacts the housing.

14. The apparatus of claim 13, wherein:
the first leg and the second leg form a first acute angle,
the third leg and the fourth leg form a second acute angle, and the first acute angle and the second acute angle oppose each other.

15. The apparatus of claim 13, wherein:
the first leg and the second leg form a first obtuse angle,
the third leg and the fourth leg form a second obtuse angle, and
the first obtuse angle and the second obtuse angle oppose each other.

16. The apparatus of claim 1, further comprising a lid covering the housing, wherein the support structure extends between the worm wheel and the lid.

17. The apparatus of claim 16, wherein the support structure is secured to the lid.

18. The apparatus of claim 1, wherein the worm wheel is made of polyoxymethylene and the support structure is made of nylon.

19. An apparatus comprising:
a motor;
a housing secured to the motor;
a worm drive including a worm and a worm wheel, the worm extending within the housing and meshing with the worm wheel, the worm being connected to be driven by the motor, the worm wheel including a first side and a second side opposing the first side, the first side including a boss outwardly projecting therefrom;
a shaft extending from the second side away from the boss, the shaft having a proximal end portion secured to the worm wheel and a distal end portion extending away from the second side; and
a support structure extending laterally within the housing relative to an axis of the shaft, the support structure being secured against rotation relative to the housing and the worm wheel, the support structure including an opening with a bearing surface within which the boss is received, the boss being rotatable within the opening and relative to the housing and the support structure the worm wheel being supported at the boss by the support structure,
wherein:
the housing has a mating feature,
the support structure has a leg extending therefrom, and
the leg fits into the mating feature.

20. The apparatus of claim 1, wherein the support structure includes plastic or rubber.

21. An apparatus comprising:
a motor;
a housing secured to the motor;
a worm drive including a worm and a worm wheel, the worm extending within the housing and meshing with the worm wheel, the worm being connected to be driven by the motor, the worm wheel including a first side and a second side opposing the first side, the first side including a boss outwardly projecting therefrom;
a shaft extending from the second side away from the boss, the shaft having a proximal end portion secured to the worm wheel and a distal end portion extending away from the second side; and
a support structure extending laterally within the housing relative to an axis of the shaft, the support structure being secured against rotation relative to the housing and the worm wheel, the support structure including an opening with a bearing surface within which the boss is received, the boss being rotatable within the opening and relative to the housing and the support structure the worm wheel being supported at the boss by the support structure,
wherein the supporting structure includes a key, the housing includes a depression, the key extends within the depression when the support structure extends within the housing.

22. The apparatus of claim 1, wherein the proximal end portion of the shaft is embedded in the worm wheel boss.

* * * * *